United States Patent [19]

Shiraishi

[11] Patent Number: 4,708,236

[45] Date of Patent: Nov. 24, 1987

[54] LINEAR MEMBER FEEDING APPARATUS

[75] Inventor: Isao Shiraishi, Yokosuka, Japan

[73] Assignee: Kabushiki Kaisha Toshiba, Kawasaki, Japan

[21] Appl. No.: 742,523

[22] Filed: Jun. 7, 1985

[30] Foreign Application Priority Data

Jul. 27, 1984 [JP] Japan ................. 59-114520

[51] Int. Cl.⁴ ............................................. B65G 25/00
[52] U.S. Cl. ................................ 198/468.2; 198/468.8
[58] Field of Search .................. 198/468.2, 468.8, 534, 198/535, 536; 193/32, 40; 221/212

[56] References Cited

U.S. PATENT DOCUMENTS 4,384,658 5/1983 Large ................................... 221/212

FOREIGN PATENT DOCUMENTS 43-28856 11/1968 Japan .
53-38625 9/1978 Japan .
60-26520 2/1985 Japan .

Primary Examiner—Frank E. Werner
Assistant Examiner—D. Glenn Dayoan
Attorney, Agent, or Firm—Cushman, Darby & Cushman

[57] ABSTRACT

A feeding apparatus has an extracting chuck for extracting one lead wire from a case storing a number of lead wires. The chuck throws the lead wire into a fixed guide chute extending vertically. A movable guide chute for guiding the lead wire dropped from the fixing guide chute to a feeding chuck is disposed below the fixed guide chute to be movable between an upper position where the movable guide chute receives the lead wire dropped from the fixed guide chute and a lower position where an outlet port of the movable guide chute is located close to the feeding chuck. When the movable guide chute is in the upper position, a magnet holds the lead wire in the movable guide chute, and when the movable guide chute is moved to the lower position, the magnet releases its hold of the lead wire, thereby feeding the lead wire to the feeding chuck.

3 Claims, 2 Drawing Figures

LINEAR MEMBER FEEDING APPARATUS

BACKGROUND OF THE INVENTION

The present invention relates to a linear member feeding apparatus for feeding linear members, e.g., lead wires of tubes, one by one to a predetermined position.

In feeding linear members, such as lead wires of tubes, to a feeding chuck, the lead wires are extracted one by one from a group of lead wires stored in a case, and are delivered to the feeding chuck. Thereafter, each lead wire is fed to the stem or bulb of a tube by the feeding chuck.

Prior art lead wire feeding apparatuses are provided with a case storing a number of lead wires. One of the lead wires is nipped and fed upward by an extracting chuck. While traveling, the extracting chuck rotates as rollers thereon rotate in contact with a cam, thereby turning the lead wire held thereby to a substantially vertical position. When the extracting chuck releases its hold of the lead wire, the lead wire drops by gravity through a vertically extending fixed guide chute into a vertically extending movable guide chute. The movable guide chute is coupled to a lift rod so that it can move up and down in the vertical direction. When the lead wire drops from the fixed guide chute into the movable guide chute, the movable guide chute is moved downward by the lift rod to guide the lead wire to the feeding chuck. Receiving the lead wire, the feeding chuck feeds it to the stem of a tube.

In feeding apparatuses constructed in this manner, the movable guide chute serves to guide the lead wire between the fixed guide chute and the feeding chuck, and is designed so as to descend in accordance with the timing for the extracting chuck to release its hold of the lead wire, the time required for the natural drop of the lead wire through the fixed guide chute, and the dropping speed of the lead wire passed through the fixed guide chute.

In the prior art feeding apparatuses, however, the lead wire disengaged from the extracting chuck may touch or slide on the inner surfaces of the fixed and movable guide chutes in the course of its natural drop, and the manner of the touch or slide contact is subject to variations. Accordingly, the time for each lead wire from the extracting chuck to reach the feeding chuck varies. In contrast with this, the time of the vertical movement of the movable guide chute is fixed. Therefore, the lead wire and the movable guide chute are not synchronized in descending action; the movable guide chute may descend too fast or too slowly. As a result, the lead wire may be delivered out of time or disengaged from the feeding chuck so that it drops unexpectedly. Thus, the lead wire cannot securely be fed. The descending speed of the movable guide chute, which depends on the dropping speed of the linear wire, cannot be set freely as required and cannot therefore be made higher than the dropping speed of the linear member. Thus, it is impossible to improve the feeding efficiency.

SUMMARY OF THE INVENTION

The present invention is contrived in consideration of these circumstances, and is intended to provide a linear member feeding apparatus capable of securely feeding a linear member to a predetermined position without dropping or dislocating the linear member.

In order to achieve the above object, a feeding apparatus according to the present invention comprises support means, storage means mounted on the support means and storing a number of linear members, a fixed guide chute attached to the support means and extending substantially vertical, the fixed guide chute having an inlet port at the top end thereof and an outlet port at the bottom end, extracting means movably disposed on the support means and adapted to extract the linear members one by one from the storage means and throw the linear members into the inlet port of the fixed guide chute, a movable guide chute for guiding the linear member dropped from the fixed chute to the predetermined position, said movable guide chute having an inlet port and an outlet port at the top and bottom ends thereof, respectively, and being disposed below the fixed guide chute to be movable between an upper position where the movable guide chute receives each of the linear members dropped from the fixed guide chute and a lower position where the outlet port of the movable guide chute is located close to the predetermined position, and holding means for holding the linear member dropped into the movable guide chute when the movable guide chute is in the upper position and releasing its hold of the linear member when the movable guide chute is moved to the lower position.

According to the feeding apparatus with the construction described above, the linear member dropped into the movable guide chute is temporarily held therein, lowered together therewith, and then dropped therefrom into the predetermined position as it is released from the hold. Accordingly, the movable guide chute can be lowered at a timing of its own and at a speed independent of the natural dropping speed of the linear member. Thus, the linear member can be prevented from being dropped or unexpected disengagement, and the feeding efficiency can be improved.

DETAILED DESCRIPTION OF THE PREFERRED EMBODIMENT

One embodiment of the present invention will now be described in detail with reference to the accompanying drawings.

Figure 1:
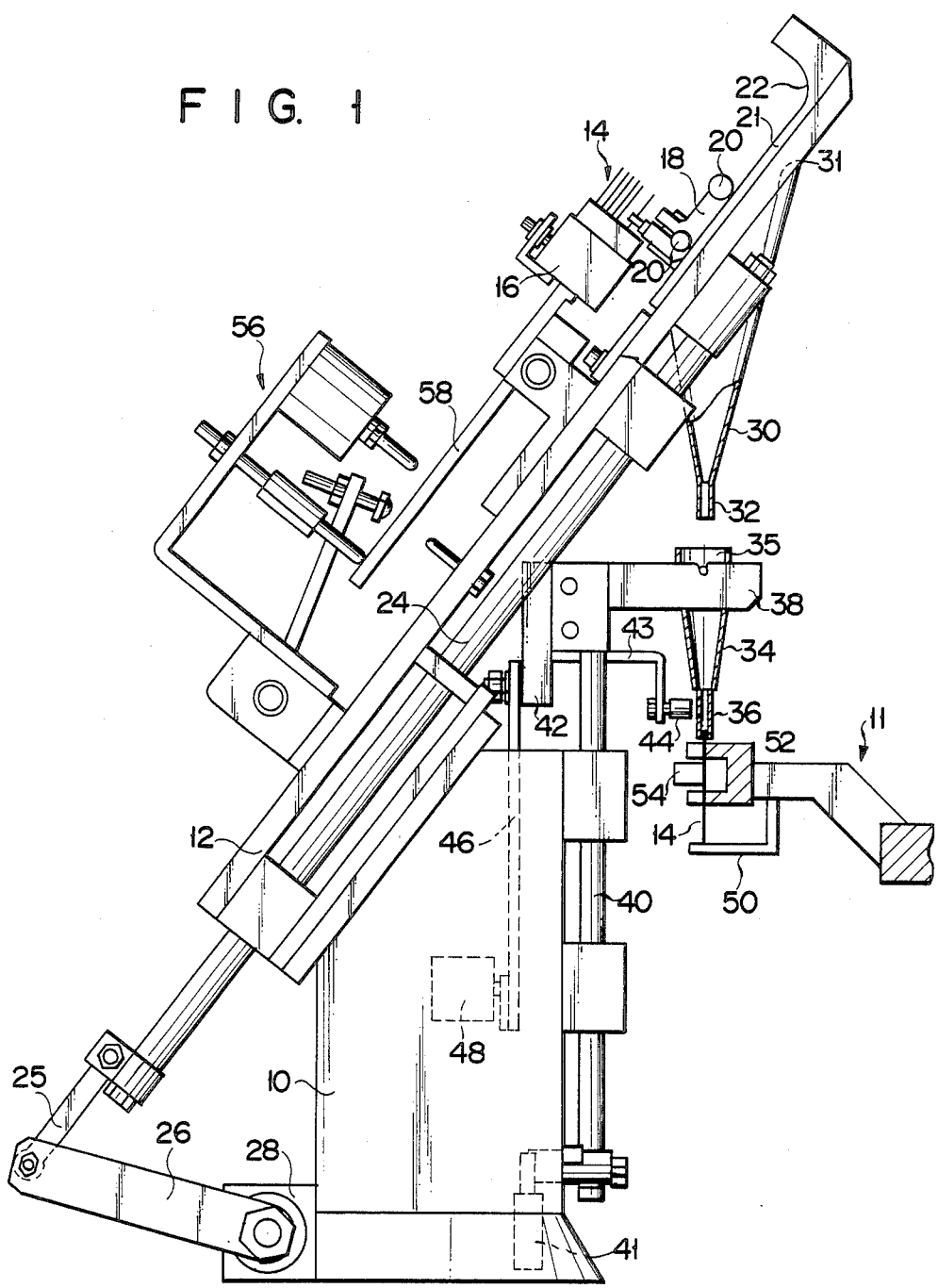
FIG. 1 is a side view of a lead wire feeding apparatus according to one embodiment of the present invention.

FIG. 1 shows a lead wire feeding apparatus for feeding lead wires to a feeding chuck 11. The feeding apparatus comprises a support base 10 and a supporting plate 12 which is fixed to the support base 10 and extends diagonally upward therefrom. The supporting plate 12 carries thereon a case 16 storing a number of lead wires 14 and an extracting chuck 18 for extracting the lead wires 14 one by one from the case 16. The chuck 18 is provided with a pair of rollers 20 and arranged to be movable between an extracting position shown in FIG. 1 and a releasing position shown in FIG. 2 along a guide rail 21 fixed on the supporting plate 12. The guide rail 21 has an arcuate cam face 22 at its upper end portion. When moved to the release position, the chuck 18 rotates, guided by the cam face 22 of the guide rail 21. The extracting chuck 18 is connected to a drive source 28 by means of a drive rod 24 and drive arms 25 and 26. Thus, the chuck 18 is driven by the drive source 28 to reciprocate between the extracting position and the releasing position.

The supporting plate 12 is fixedly fitted with a vertically extending fixed guide chute 30, which receives the lead wires 14 released from the chuck 18. The fixed guide chute 30 has an inlet port 31 at the top end thereof opening to the supporting plate 12 and an outlet port 32 at the bottom end. A movable guide chute 34 is disposed below the fixed guide chute 30 so as to be coaxial therewith. After passing through the fixed guide chute 30, the lead wire 14 drops into the movable guide chute 34. The movable guide chute 34 has an inlet port 35 at the top end and an outlet port 36 at the bottom end. The movable guide chute 34 is supported on the support base 10 by a supporting arm 38 and a lift rod 40. The lift rod 40 is connected to a drive source, e.g., an air cylinder 41, disposed inside the support base 10, and is moved up and down by the air cylinder 41. Thus, the movable guide chute 34, along with the lift rod 40 and the supporting arm 38, is vertically reciprocated between an upper position shown in FIG. 2 and a lower position shown in FIG. 1. In the upper position, the lower end of the fixed guide chute 30 is inserted in the inlet port 35 of the movable guide chute 34. In the lower position, the lower end or outlet port 36 of the movable guide chute 34 is located close to the feeding chuck 11.

A swinging arm 42 is swingably mounted on the supporting arm 38, and a permanent magnet 44 is attached to the swinging arm 42 by means of a support member 43. The swinging arm 42 is coupled to a drive source such as an air cylinder 48 by means of a coupling lever 46, and is adapted to be swung by the air cylinder 48. Thus, the magnet 44 can move up and down along with the supporting arm 38 and the movable guide chute 34, and can also swing relatively to the supporting arm 38 between an attracting position where the magnet 44 is located close to the outlet port 36 of the movable guide chute 34 and a releasing position where the magnet 44 is distant from the outlet port 36.

Figure 2:
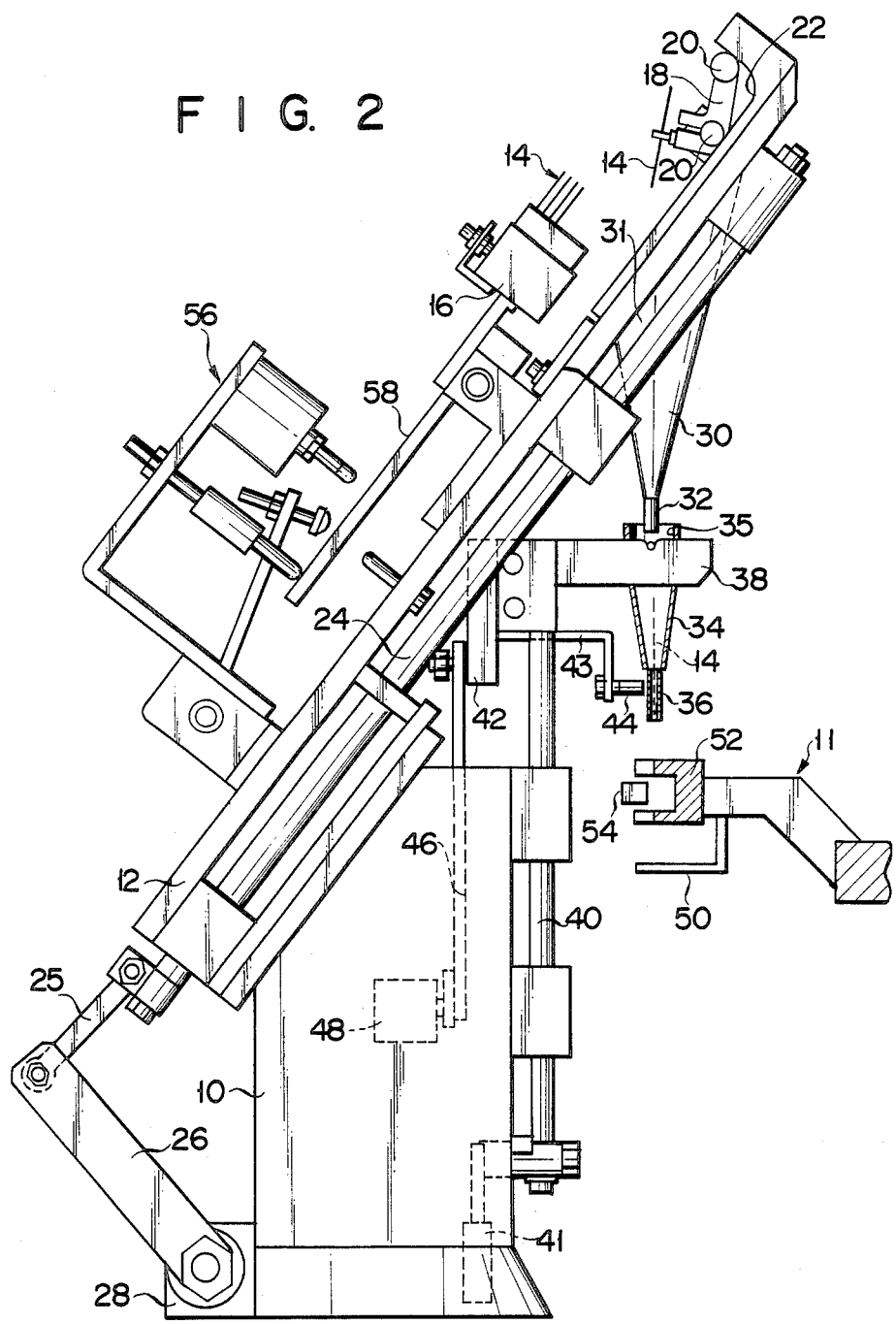
FIG. 2 is a side view of the apparatus of FIG. 1 in a different operating state.

The feeding chuck 11 includes a stopper 50 for stopping the lead wires 14 dropped from the movable guide chute 34, a chuck body 52, and a movable nipper 54. In FIGS. 1 and 2, numeral 56 designates a striking mechanism for striking a lever 58 extending from the case 16, so that the lead wires 14 in the case 16 are prevented from being one-sided.

The operation of the lead wire feeding apparatus with the above construction will now be described.

First, the extracting chuck 18 is moved by the drive rod 24 to the extracting position, where it picks up one of the lead wires 14 in the case 16, as shown in FIG. 1. Thereafter, the extracting chuck 18 is moved to the releasing position shown in FIG. 2 by the drive rod 24. Thus, the chuck 18 rotates along the cam face 22, thereby turning the lead wire 14 held thereby to a substantially vertical position. When the chuck 18 releases its hold of the lead wire 14, the lead wire 14 drops into the fixed guide chute 30 by gravity. At this time, the movable guide chute 34 is located in its upper position, as shown in FIG. 2, and the magnet 44 in the attracting position. Accordingly, the lead wire 14 naturally dropped through the fixed guide chute 30 into the movable guide chute 34 is attracted to the inner surface of the movable guide chute 34 to be held therein by the attraction of the magnet 44, as indicated by a broken line in FIG. 2. Since the lead wire 14 is as light as about 50 mg, it can securely be attracted by the magnet 44.

Subsequently, the movable guide chute 34, along with the magnet 44, is moved to the lower position by the lift rod 40, holding the lead wire 14 as it is. As a result, the outlet port 36 of the movable guide chute 34 is located close to the chuck body 52 of the feeding chuck 11, as shown in FIG. 1. Thereafter, when the magnet 44 is swung to the releasing position by the air cylinder 48 through the coupling lever 46 and the swinging arm 42, the lead wire 14 in the movable guide chute 34 is released from the attraction by the magnet 44 to be dropped naturally, and is then delivered to the feeding chuck 11. The dropped lead wire 14 is stopped by the stopper 50 and held by the chuck body 52 and the nipper 54, as shown in FIG. 1.

Thereafter, the movable guide chute 34 and the magnet 44 are shifted to the upper position, and at the same time, the magnet 44 is moved to the attracting position. In this state, the movable guide chute 34 and the magnet 44 wait for the next lead wire to drop from the fixed guide chute 30. Meanwhile, the feeding chuck 11 holding the lead wire 14 is rotated to feed the lead wire 14 to a stem glass (not shown).

The feeding apparatus constructed in this manner has the following advantages.

The movable guide chute 34 is designed so as to receive the lead wire 14 dropped from the fixed guide chute 30 and to deliver the lead wire 14 to the feeding chuck 11. Therefore, the movable guide chute 34 need not be lowered in accordance with the natural dropping speed of the lead wire 14. Thus, the movable guide chute 34 can descend at a speed of its own after taking hold of the lead wire 14. In other words, the descending timing and speed of the movable guide chute 34 are independent of the natural dropping speed of the lead wire 14. Accordingly, the movable guide chute 34 can have a stand-by time long enough for secure reception of the lead wire 14. Even if the dropping speed of the lead wire varies during the passage through the fixed guide chute 30, therefore, the lead wire 14 from the fixed guide chute 30 can securely be thrown into the movable guide chute 34 without dropping untimely. Also, the descending speed of the movable guide chute 34 can be made higher than the natural dropping speed of the lead wire 14 for the improvement of the feeding efficiency.

The lead wire 14 is dropped from the movable guide chute 34 into the feeding chuck 11 while the outlet port 36 of the movable guide chute 34 is located close to the feeding chuck 11. Accordingly, the lead wire 14 can more securely be fed without the possibility of dropping to a position off the feeding chuck 11. In the prior art feeding apparatuses, the lead wire disengaged from the extracting chuck drops at a stroke into the feeding chuck through the fixed and movable guide chutes. Therefore, the dropping distance is long, and the dropping speed of the lead wire is relatively high. In this case, the lead wire positively bounds upward against the stopper of the feeding chuck. This bounding is repeated several times before the lead wire rests on the stopper. Thus, the lead wire requires a long time before it is settled, lowering the feeding efficiency. In contrast with this, the lead wire according to the present invention, which is dropped from the region near the feeding chuck 11, can immediately rest on the stopper 50 without substantially bounding against the same. It is therefore possible to further improve the feeding efficiency.

It is to be understood that the present invention is not limited to the embodiment described above, and that various changes and modifications may be effected therein by one skilled in the art without departing from the scope or spirit of the invention. In the above embodiment, for example, a permanent magnet is used for the holding means. However, an electromagnet may be used in place of the permanent magnet. In this case, the lead wire is attracted and released by energizing and deenergizing the electromagnet, respectively. It is to be understood, moreover, that the present invention may also be applied to the feed of any other linear members than lead wires. Furthermore, the drive sources are not limited to the air cylinder and an electromagnetic cylinder, a cam drive or a motor drive may be used as required.

What is claimed is:

1. A feeding apparatus for feeding a linear member to a predetermined position, comprising:

support means;

storage means, mounted on the support means, for storing a number of linear members;

a fixed guide chute attached to the support means and extending substantially in the vertical direction, said fixed guide chute having an inlet port at the top end thereof and an outlet port at the bottom end;

extracting means movably disposed on the support means and adapted to extract the linear members one by one from the storage means and drop the linear members into the inlet port of the fixed guide chute;

a supporting member supported by the support means to be movable between an upper position and a lower position;

first drive means for moving the supporting member between said upper and lower positions;

a movable guide chute for guiding the linear member dropped from the fixed guide chute to the predetermined position, said movable guide chute having an inlet port and an outlet port at the top and bottom ends thereof, respectively, and being mounted on the supporting member to be movable integral with the supporting member and located below the fixed guide chute, said movable guide chute receiving each of said linear members dropped from the fixed guide chute when the supporting member moves to the upper position and said outlet port of the movable guide chute being located close to the predetermined position when the supporting member moves to the lower position;

holding means having a magnet supported by the supporting member to be movable integral with the supporting member and to be movable between an attracting position near the movable guide chute and a releasing position distant from the movable guide chute, for holding the linear member dropped into the movable guide chute when the movable guide chute is in the upper position and releasing its hold of the linear member when the movable guide chute is moved to the lower position; and second drive means for moving the magnet to the attracting position when the supporting member is in the upper position and moving the magnet to the releasing position when the supporting member is in the lower portion.

2. The feeding apparatus according to claim 1, wherein said magnet is a permanent magnet.

3. The feeding apparatus according to claim 1, wherein said linear member is a lead wire used in a tube.

* * * * *